US005956062A

United States Patent [19]
Omata et al.

[11] Patent Number: 5,956,062
[45] Date of Patent: *Sep. 21, 1999

[54] LIQUID JET RECORDING APPARATUS AND RECOVERY METHOD THEREFOR

[75] Inventors: Kouichi Omata, Kawasaki; Tsutomu Harada, Tokyo; Tatsuya Fukushima, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,207

[22] Filed: Dec. 29, 1995

[30] Foreign Application Priority Data

Jan. 11, 1995 [JP] Japan .................................... 7-002484

[51] Int. Cl.[6] .................................................... G01D 15/16

[52] U.S. Cl. .............................................................. 347/89

[58] Field of Search ................................ 347/84, 85, 89, 347/90, 91, 92

[56] References Cited

U.S. PATENT DOCUMENTS

| | | | |
|---|---|---|---|
| 4,614,948 | 9/1986 | Katerberg | 347/89 |
| 4,737,801 | 4/1988 | Ichihashi et al. | 347/85 |
| 4,896,172 | 1/1990 | Nozawa et al. | 347/17 |
| 4,929,963 | 5/1990 | Balazar | 347/89 |
| 5,231,424 | 7/1993 | Kaneko et al. . | |
| 5,296,875 | 3/1994 | Suda . | |
| 5,457,485 | 10/1995 | Moriyama et al. | 347/92 |

FOREIGN PATENT DOCUMENTS 448967 10/1991 European Pat. Off. .

*Primary Examiner*—Matthew Nguyen
*Attorney, Agent, or Firm*—Fitzpatrick, Cella, Harper & Scinto

[57] ABSTRACT

A liquid jet recording apparatus is structured to enable recording liquid to circulate by conductively connecting the recording head for discharging recording liquid and means for retaining recording liquid through a forwarding path for recording liquid to flow into the head and a returning path for recording liquid to flow out from the head. This apparatus comprises means for generating pressure to suck recording liquid on the returning path from the head, while exerting pressure on recording liquid in the forwarding path toward the head. In this way, dust particles and air bubbles in ink are removed without allowing ink to flow out of the discharge ports of the recording head so as to save the consumption of ink to be used wastefully when a recovery operation is executed for the apparatus.

27 Claims, 8 Drawing Sheets

LIQUID JET RECORDING APPARATUS AND RECOVERY METHOD THEREFOR

BACKGROUND OF THE INVENTION

1. Field of the Invention

The present invention relates to an ink jet recording apparatus (hereinafter, may also be referred to as a liquid jet recording apparatus). More particularly, the invention relates to an ink jet recording apparatus that performs its recovery operation by circulating ink between the recording head and ink tank.

2. Related Background Art

As has been represented by ink jet recording apparatuses, it is necessary to make an arrangement so that recording liquid (hereinafter, may also be referred to as ink) can flow in a path whose sectional area is extremely fine, and that the apparatus should be provided with means for preventing such path from being clogged by dust in ink, educt of ink or bubbles in ink. For an ink jet recording apparatus, a dust removal device, which is provided with a filter for removing fine dust and air bubbles, is installed on the ink supply system that carries ink from an ink tank to discharge ports through a common liquid chamber so as not to cause the discharge ports that discharge ink droplets to be clogged by dust and other educt.

FIG. 4 and FIG. 5 are cross-sectional views which schematically illustrate the entire structure of such conventional supply recovery system and dust removal device, respectively.

The dust removal device shown in FIG. 4 and FIG. 5 is used for a structure that executes a recovery process by circulating ink.

When ink is carried from the ink tank to the recording head through the ink forwarding path or returning path at the time of recording, it is usual that the ink is not carried by the application of any pressure exerted by means of a pump, but by the application of capillary force or the like created by the recording head in cooperation of the supply of ink. At this juncture, air bubbles should pass the filter of the dust removal device. Such arrangement is necessary because if the air bubbles are caused to enter the recording head and reside on the ink path on the discharge port side, its discharge becomes unstable, and in the worst case, ink discharges are disabled.

In FIG. 5, the ink 2, which flows in from the ink tank in the direction indicated by an arrow a through the ink forwarding path or returning path at the time of recording, is carried through a flow-in tube 21 to the dust removal device 20 having a filter 1. The ink 2 that flows in the flow path 3 of the dust removal device 20 is filtered by means of the filter 1 that does not allow any dust particles or the like whose diameter is larger than 10 $\mu$m to pass. By use of this filter 1, the dust particles 4 and air bubbles 5 in ink 2 are caused to stay on the side at a, that is, the upstream side of the filter 1. Then, dust particles and air bubbles do not flow to the side indicated by an arrow b, that is, the downstream side that corresponds to a flow-out tube 22.

On the other hand, at the time of recovery, ink is carried from the ink tank through the ink forwarding path to the ink head under pressure by means of a pump, and the ink is circulated further from the recording head under pressure to the ink tank through the ink returning path. By this circulation, the air bubbles residing in the ink forwarding path, returning paths, and recording head are caused to return to the ink tank, and then, released from the ink tank to the air outside.

At this juncture, the air bubbles should pass each filter of the dust removal device installed on the way of the ink forwarding path or ink returning path.

In order to allow the air bubbles to pass the filter, there is a need for the provision of a specific difference in pressure before and after the filter so as to break the meniscus formed by ink and a gaseous body on the surface of the filter.

In accordance with the prior art shown in FIG. 4, all the ink should pass the filter 1 of the dust removal device 6 when ink is carried under pressure by means of a pump at the time of a recovery operation, and then, a great difference is created in pressure before and after the filter due to the pressure loss at the filter 1; hence allowing the air bubbles to pass the filter.

The ink and air bubbles that have passed the filter 1 are caused to enter the common liquid chamber 14 from one end of the recording head 13. Thus, a part of ink flows from the discharge ports 15 to the outside, and expel the air bubbles in the nozzles at that time, while the remaining portion of the ink passes the common liquid chamber 14 and enters the dust removal device 7 installed on the ink returning path after flowing out from the other end of the recording head 13. As in the case of the dust removal device 6 installed on the ink forwarding path, air bubbles should pass the filter when a pressure difference is created before and after the filter 1 due to the pressure loss at the filter 1 of the dust removal device 7; hence being circulated to the ink tank.

However, because of the event that the pressure loss is created even at the dust removal device 7 in the ink returning path when being carried under pressure by means of a pump, the amount of ink flowing out from the discharge ports becomes considerably greater than the normal amount of ink to be required just for removing the air bubbles in the nozzles. As a result, the amount of waste ink becomes unfavorably greater in terms of running costs.

Also, the flow rate of ink passing the dust removal device 7 installed on the ink returning path becomes smaller than that of ink passing the dust removal device 6 installed on the forwarding path to the extent that ink should flow out from the discharge ports inevitably.

Therefore, in order to secure a specific difference in pressure (flow rate) before and after the filter on the returning ink path, too, it is necessary to make the capacity of such pump larger so that the ink flow rate is still sufficient on the dust removal device 7 on the ink returning path even after the ink is caused to flow out from the discharge ports. This arrangement unfavorably brings about the higher costs of the apparatus.

Now, the description will be made of problems that should be encountered when a recovery operation is performed by use of a pump whose flow rate is small.

In other words, whereas the air bubbles can still pass the filter of the dust removal device on the ink forwarding path by use of such a pump, the air bubbles cannot pass the filter of the dust removal device on the ink returning path. As a result, those bubbles residing on the common liquid chamber side of the filter are caused to enter the recording head at the time of recording operation, and then, disabled ink discharges may ensue.

The present inventors have measured the differences in pressure before and after the filters of the dust removal devices, and obtained the results shown in Table 1 given below. Numerical values in the Table 1 indicate the pressures at the entrance side of the dust removal device 6 (A); the exit side thereof (B); the entrance side of the dust removal device 7 (C); and the exit side thereof (D), respectively, provided that the flow rate of the pump is set at approximately 1.5 ml per second, and the area of the filter, approximately 30 $mm^2$.

TABLE 1

| | A | B | C | D |
|---|---|---|---|---|
| Pressure (mmAq) | 1550 | 980 | 310 | 200 |

Observing the results shown in this table, it is understandable that the difference in pressure between C and D becomes smaller when the pressure drops down due to the flowing out of ink from nozzles of the conventional apparatus, and this event makes it impossible for the air bubbles to pass the filter.

In a case of an elongated head having many numbers of nozzles, the amount of ink that flows out is greater to the extent that the number of nozzles is increased. In this respect, the drawback described above is particularly conspicuous.

SUMMARY OF THE INVENTION

It is an object of the present invention to provide a liquid jet recording apparatus capable of performing the recovery operation reliably by means of a pump having a small capacity, while significantly reducing the amount of waste liquid at the time of recovering the apparatus.

It is another object of the invention to provide a liquid jet recording apparatus structured to enable recording liquid to circulate by conductively connecting the recording head that discharges recording liquid and means for retaining recording liquid through two recording liquid paths, one to the recording liquid flowing-in side and the other to the recording liquid flowing-out side of the recording head, this apparatus being provided with means for generating pressure to suck the recording liquid flowing out from the recording liquid flowing-out side of the recording head, while giving pressure to the recording liquid flowing into the recording liquid flowing-in side of the recording head.

In order that the air bubbles pass the filter, it should be arranged to create a specific difference in pressure before and after the filter as described earlier. Therefore, in accordance with the present invention, by use of the apparatus described above, ink is carried under pressure by means for generating pressure on the ink forwarding pass, and sucking ink on the ink returning path side by use of the same means for generating pressure or a separate means for generating pressure.

It is still another object of the present invention to provide a recovery method for a liquid jet recording apparatus structured to enable recording liquid to circulate by conductively connecting the recording head that discharges recording liquid and means for retaining recording liquid through two recording liquid paths, one to the recording liquid flowing-in side and the other to the recording liquid flowing-out side of the recording head, this method comprising the step of performing the circulation of recording liquid by sucking the recording liquid flowing out from the recording liquid flowing-out side of the recording head, while exerting pressure on the recording liquid flowing into the recording liquid flowing-in side of the recording head.

It is a further object of the present invention to provide a liquid jet recording apparatus structured to enable recording liquid to circulate by conductively connecting the recording head for discharging recording liquid and means for retaining recording liquid through a forwarding path for recording liquid to flow into the head and a returning path for recording liquid to flow out from the head, this apparatus comprising means for generating pressure to suck the recording liquid on the returning path from the head, while exerting pressure on the recording liquid in the forwarding path toward the head.

It is still a further object of the present invention to provide a recovery method for a liquid jet recording apparatus structured to enable recording liquid to circulate by conductively connecting the recording head for discharging recording liquid and means for retaining recording liquid through a forwarding path for recording liquid to flow into the head and a returning path for recording liquid to flow out from the head, this method comprising the step of circulating recording liquid by sucking the recording liquid on the returning path from the head, while exerting pressure on the recording liquid in the forwarding path toward the head.

In accordance with the present invention, it is possible to significantly reduce the amount of waste ink and reliably remove air bubbles at the filters when operating the recovery of an ink jet recording apparatus by use of a pump having a small capacity, thus making running costs lower. It is also possible to suppress the manufacturing costs of the apparatus to a lower level.

DETAILED DESCRIPTION OF THE PREFERRED EMBODIMENTS

Figure 7:
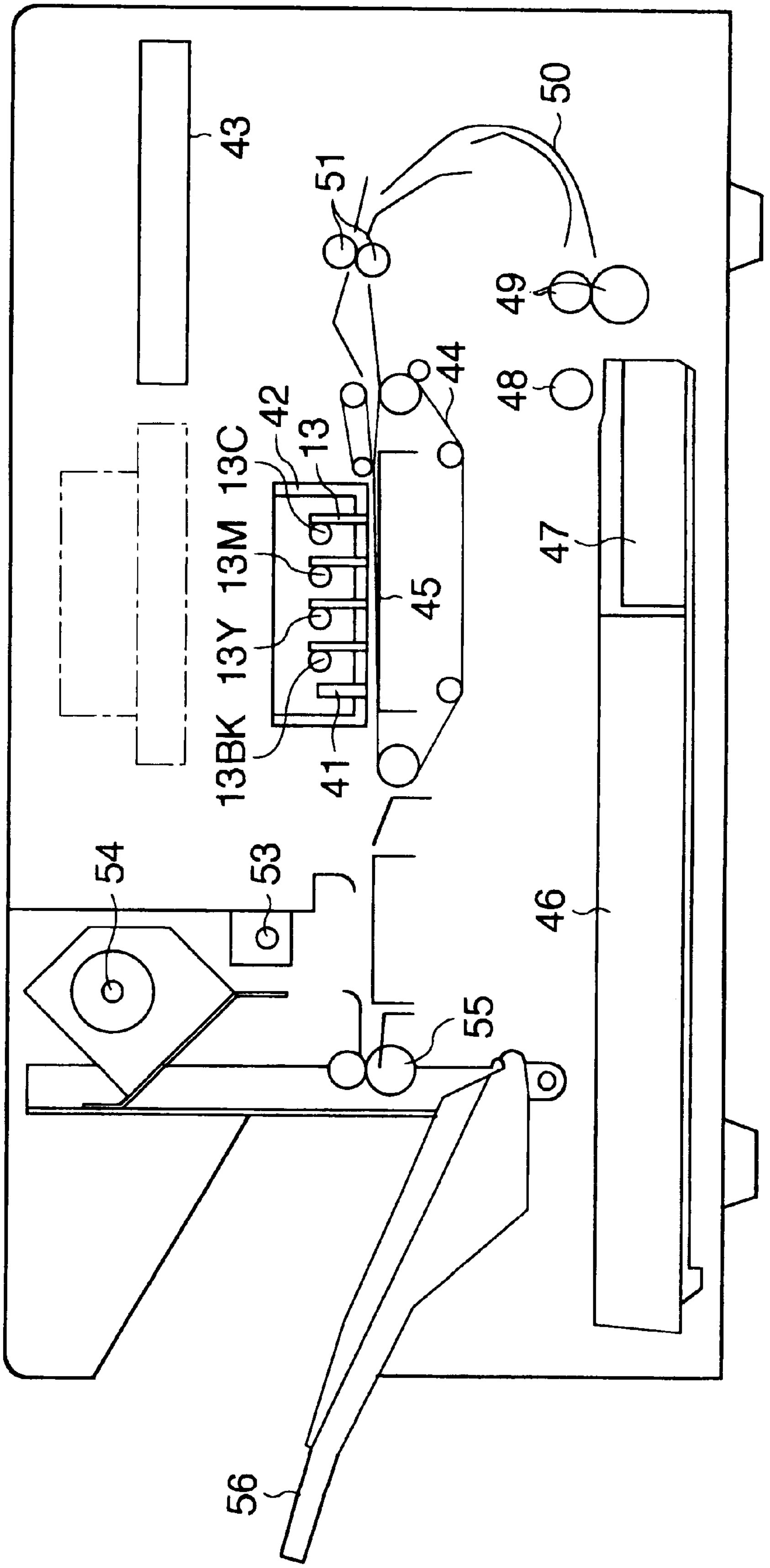
FIG. 7 is a view which schematically shows one example of an ink jet recording apparatus to which the present invention is applicable.

FIG. 7 is a view which schematically shows one example of an ink jet recording apparatus to which the present invention is applicable.

In FIG. 7, reference marks 13Bk, 13Y, 13M, and 13C designate the bubble jet type recording heads for the respective colors of black, yellow, magenta, and cyan. Each of them is provided with electrothermal transducing elements as means for generating discharge energy. When each of such elements is energized, ink droplets are discharged from the discharge ports with the air bubbles created in ink as the source of pressure to be applied when each of the elements is energized. Each of the heads is fixed to a block 42. In this respect, each recording head is provided with an array of 4,736 discharge ports at a density of 400 dpi.

Also, for the block 42, a reading head 41 is installed to detect the discharging and non-discharging numbers of the discharge ports.

A reference numeral 43 designates a capping unit. When recording is at rest, such as being on standby, the block 42 is raised to a position indicated by one-dot chain line in FIG. 7, and then, the unit 43 is brought to face the recording heads 13C to 13Bk for capping. Also, the capping unit 43 functions to serve as a tray to receive the waste ink that has been carried by means of a recovery pump and ink supply system (not shown) and expelled from the discharge ports at the time of executing the circulating recovery. Thus the waste ink is guided to a waste ink tank (not shown).

A reference numeral 44 designates a charged adsorption endless belt for feeding a recording sheet, which is arranged to face each of the recording head 13Bk, 13Y, 13M, and 13C at given intervals, and 45, a back platen arranged to face each of the recording heads through the charged adsorption belt 44.

A reference numeral 46 designates a feed supply cassette detachably mounted on the apparatus main body to store recording sheets 47 such as ordinary paper or the like; 48, a pick up roller to feed out one sheet on the top of the stacked recording sheets 47; 49, a feed roller to feed the recording sheet 47 picked up by the pick up roller 48 to the feeding path 50; and 51, a feed roller arranged on the exit side of the feeding path 50.

Reference numerals 53 and 54 designate a heater and a fan to dry and fix the ink droplets adhering to the recording sheet 47 as the result of recording; 55, an exhaust roller to exhaust the recording sheet 47 out of the apparatus after the completion of its fixing process; and 56, a tray to stock the exhausted sheets 47 one after another.

Now, the description will be made of the operation of the apparatus whose structure is arranged as above.

At first, the recording operation will be described. When a recording operation begins, a recording sheet 47 of a designated size is picked up by the pick up roller 48 from the supply and feed cassette 46. The recording sheet 47 thus picked up for supply is mounted by the feed rollers 49 and 51 on the charged adsorption belt 44, which rotates in a state that it is charged, and at the same time, formed in a flat configuration by means of the back platen 45. Then, interlocked with the arrival of the leading end of the recording sheet 47 at a position underneath each of the heads 13C, 13M, 13Y, and 13Bk, respectively, the electrothermal transducing elements of each head are driven in accordance with image data. By this driving, the respective ink droplets are caused to fly from each of the discharge ports toward the surface of the recording sheet 47 corresponding to such image data: the intended images are formed when ink droplets impact on the surface thereof accordingly.

If the recording sheet 47 is not hygroscopic enough, the droplets that have adhered to the surface thereof do not dry. Print stains may result form rubbing. Therefore, fixing process is conducted by means of forced drying using the heater 53 and fan 54. After fixing, the recording sheet 47 is exhausted by use of the exhaust roller 55 to the tray 56.

As described above, color images are formed by applying the respective image signals correspondingly to each of the recording heads prepared for ink of different colors, cyan, magenta, yellow, and black, respectively.

Figure 8:
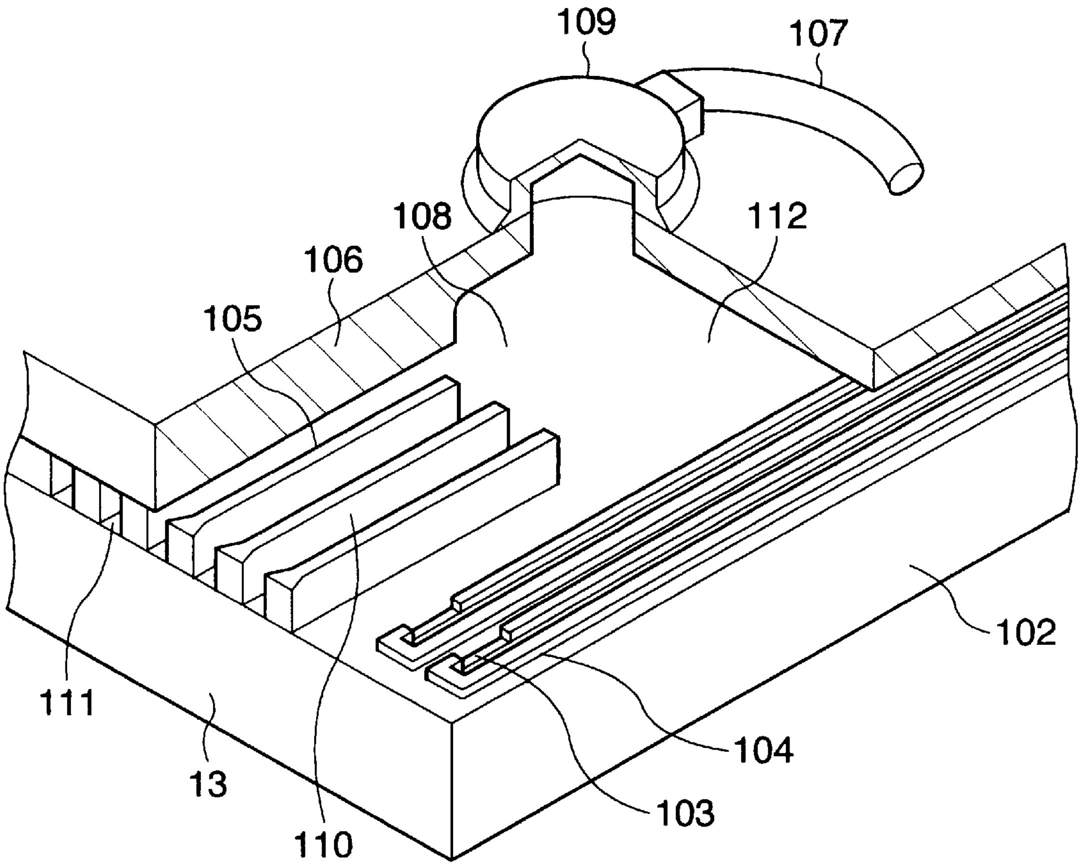
FIG. 8 is a cut-off perspective view schematically showing one example of the ink jet recording head used for the ink jet recording apparatus represented in FIG. 7.

FIG. 8 is a view which shows one example of the ink jet recording head that has been described above. This head comprises electrothermal transducing elements 103, electrodes 104, walls of liquid paths 105, and a ceiling board 106, which are formed on a base board 102 by means of the film formation technique of the semiconductor fabrication processes such as etching, deposition, sputtering. Recording ink 112 is supplied from the ink retaining chamber (not shown) to the common liquid chamber 108 of the recording head 101 through an ink supply tube 107. In FIG. 8, a reference numeral 109 designates a connector for use of the ink supply tube. The ink 112 that has been supplied to the interior of the common liquid chamber 108 is carried to the liquid path 110 by the application of capillary phenomenon. It is held stably by the formation of meniscus at the ink discharge port 111 formed on the leading end of the liquid path. Here, when an electro thermal transducing element 103 is energized, ink on the surface of the electrothermal transducing element is heated to create foaming phenomenon. By the energy generated by such foaming, a droplet is discharged from the ink discharge port 111. With such structure as described above, an ink jet recording head is formed, in which a multiple discharge port is arranged with the discharge elements in a high discharge port density of as many as 400 dpi.

Hereinafter, with reference to the accompanying drawings, the present invention will be described in detail in accordance with the embodiments thereof.

(First Embodiment)

Figure 1:
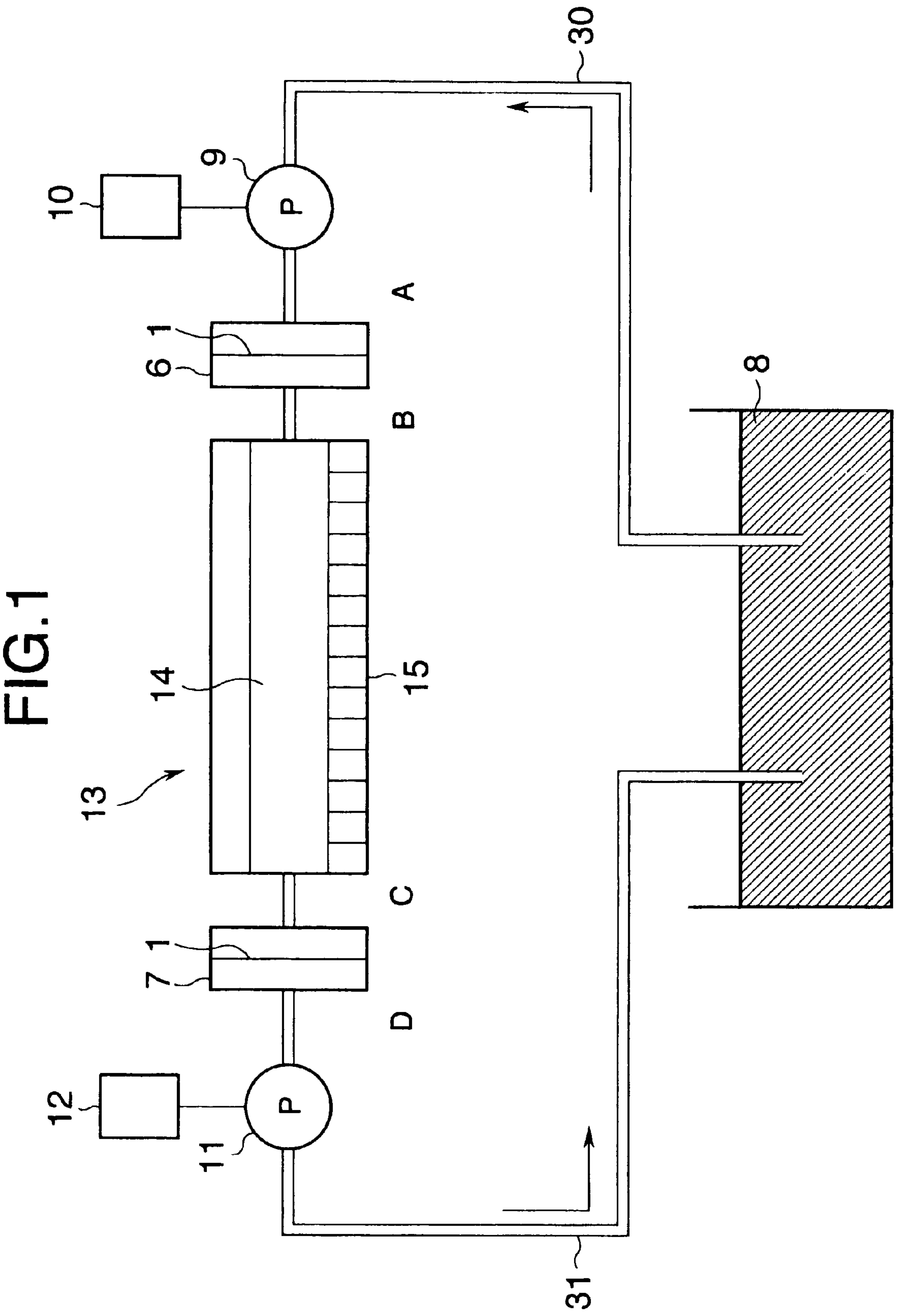
FIG. 1 is a view which schematically shows one example of the supply recovery system of an ink jet recording apparatus in accordance with the present invention.

FIG. 1 is a view which schematically shows one example of the supply recovery system of an ink jet recording apparatus in accordance with the present invention. In FIG. 1, a reference numeral 13 designates a recording head for discharging ink; 6, a dust removal device on the side where ink flows into the recording head at the time of recovery operation; 7, a dust removal device on the side where ink flows out; 9 and 11, pumps (tube pumps); and 10 and 12, controllers.

The recording head is provided with 1,344 discharge ports. The volume of ink per droplet is approximately 50 pl (picolitter). At the time of recording, ink droplets are discharged by means of a recording head driving circuit (not shown).

A mechanism is arranged to open each of the tubes of the tube pumps 9 and 11 by the application of signals transmitted from the controllers 10 and 12 at the time of recording operation. Thus ink can pass the pumps freely.

Passing the ink paths 30 and 31, ink enters the dust removal devices 6 and 7 by way of the pumps 9 and 11 whose tubes are open, and filtered by filters 1 in the dust removal devices. By means of the filters 1, dust particles and air bubbles in ink are caused to reside on its upstream sides, respectively, and do not enter the recording head, hence making it possible to keep discharges in stable condition.

Figure 6:
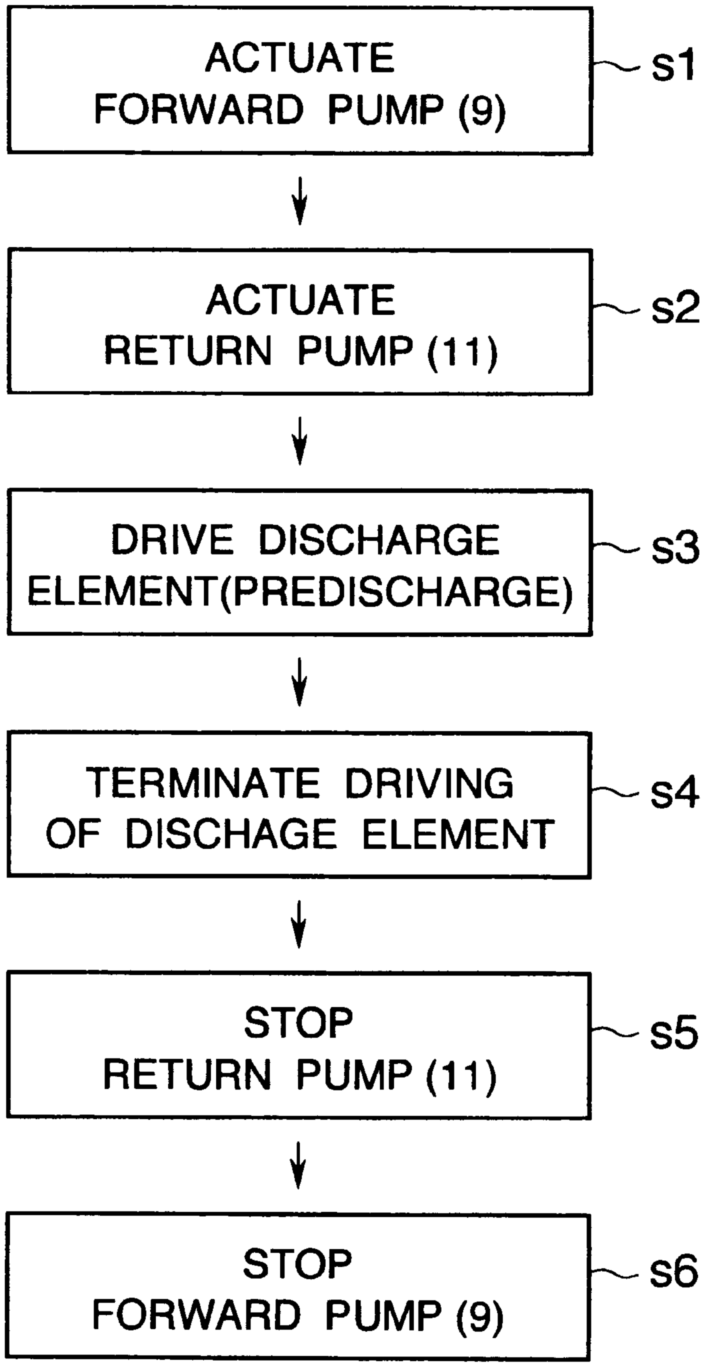
FIG. 6 is a flowchart which shows the procedure of recovery operation in accordance with a first embodiment of the present invention.

For an ink jet recording apparatus, the recovery operation is executed timely immediately before a recording operation after the power source of the apparatus is turned on or in order to remove air bubbles that reside in the common liquid chamber of the recording head, nozzles, dust removal devices, or in any other ink paths. The following is the procedure of such recovery operation:

FIG. 6 is a flowchart which shows the procedure of the recovery operation in accordance with the present embodiment. At first, the controllers 10 and 12 transmit control signals to drive the pumps 9 and 11, respectively. Preferably, as indicated in S1 and S2 in FIG. 6, the pump 11 is actuated after the pump 9 has been actuated, because in this way it is possible to prevent any gaseous body from being sucked in from the discharge ports. The pump 9 presses and carries ink in the direction from A to B in FIG. 1, while the pump 11 presses and carries ink in the direction from C to D in FIG. 1. The amounts of ink that are carried under pressure by means of the pumps 9 and 11 are almost equal to each other.

Passing the pump 9 from the ink tank 8 through the liquid path 30, ink enters the dust removal device 6 on the forwarding path side.

As in the conventional apparatus, the dust removal device 6 on the forwarding path side allows all ink to pass the filter 1 of the device 6 by the application of pressurized ink feed by use of a pump. Therefore, due to the pressure loss through the filter 1, there occurs a great difference in pressure before and after the filter 1. As a result, air bubbles and ink enter the common liquid chamber 14 of the recording head through the filter.

At the same time, the pump 11 on the returning path side sucks ink in an amount almost the same as that of ink flowing into the common liquid chamber 14. Therefore, during the recovery operation, the interior of the common liquid chamber 14 is kept substantially at the atmospheric pressure. Hence there is no possibility that ink flows out from the discharge ports 15.

The ink and air bubbles that have entered the common liquid chamber 14 are caused to pass that chamber without flowing out from the discharge ports, and arrive at the dust removal device 7 on the returning path side. Due to the action of the pump 11, the flow rate of ink for the dust removal device 7 on the returning path side is kept at the same level as that on the forwarding path side. Therefore, the air bubbles can pass the filter 1 exactly as on the forwarding path side.

Here, the differences in pressure are measured before and after the filters of the dust removal devices of the present embodiment. Table 2 shows the results of measurements thus obtained. Numerical values shown in Table 2 indicate pressures at the entrance side of the dust removal device 6 (A), exit side thereof (B), entrance side of the dust removal device 7 (C), and exist side thereof (D) provided that the flow rate of the pumps is set at approximately 1.5 ml per second with the filter area being approximately 30 mm$^2$.

TABLE 2

| | A | B | C | D |
|---|---|---|---|---|
| Pressure (mmAq) | 650 | 50 | −28 | −510 |

From the Table 2, it is understandable that a sufficient difference is obtainable between C and D. Therefore, air bubbles can also pass the filter on the ink returning path.

After that, ink and air bubble are circulated to the ink tank 8 by way of the liquid path 31 through the pump 11. The air bubbles are then released to the air outside.

In parallel with the ink circulation described above, it is preferable to execute predischarge with respect to the cap, for example, by driving the ink discharging elements of the recording head for a specific period of time as indicated in S4 and S5 in FIG. 6. An enhanced recovery effect is obtainable by means of the ink circulation and predischarge, which are arranged to cooperate with each other for the purpose.

In order to remove the air bubbles remaining in nozzles of the recording head, the pump 11 is suspended first on the returning path side (flowing-out side) at the end of the recovery operation as indicated in S5 and S6 in FIG. 6, and then, after approximately 0.5 second, the pump 9 is suspended on the forwarding side (flowing-in side).

During the period of 0.5 second in which the pump 11 is suspended but the pump 9 is still in operation, the interior of the common liquid chamber 14 is being pressurized. Therefore, ink is caused to flow out from the discharge ports to expel the air bubbles that have resided in the nozzles.

In this respect, the driving timing of the pumps described above may be set appropriately so that air bubbles in the nozzles can be removed in accordance with the specifications of the recording head and pump to be used.

As described above, in accordance with the present invention, the amount of ink that should be discarded as waste ink is extremely limited only to the one used for removing air bubbles in the nozzles. No ink is wastefully used for removing air bubbles in the liquid paths and common liquid chamber.

Also, unlike the conventional apparatus, there is no need for the provision of any pump whose capacity is large enough to cause a sufficient amount of ink to flow into the returning path side in consideration of the estimated flow out of ink from the discharge ports. As a result, it is possible to adopt simply structured pumps of a small capacity for the effective removal of air bubbles.

(Second Embodiment)

Figure 2:
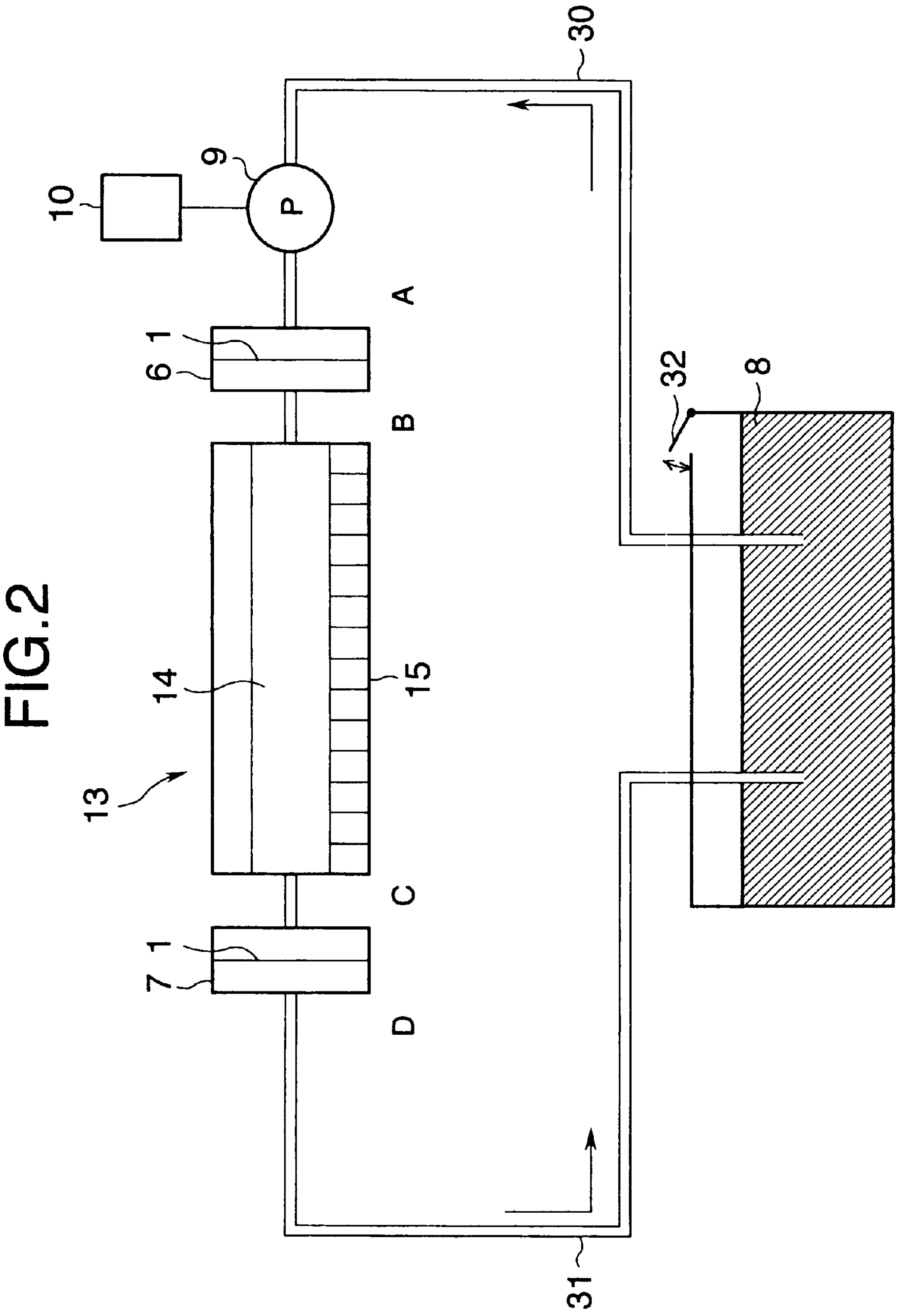
FIG. 2 is a view which schematically shows another example of the supply recovery system of an ink jet recording apparatus in accordance with the present invention.

FIG. 2 is a view which shows another example of the apparatus in accordance with the present invention.

In FIG. 2, a pump is used only for the ink returning path. A valve 32 is provided for the ink tank 8, which is opened and closed in accordance with signals from the controller 10.

At the time of recording operation, the valve 32 is opened by means of the controller 10, and then, as in the first embodiment, ink is being supplied.

At the time of recovery operation, the valve 32 is closed by the application of signal from the controller 10, thus causing the ink tank to be airtightly closed. When the pump 9 is driven to carry ink under pressure, while the ink tank is airtightly closed, ink is carried from the liquid path 30 to the dust removal device 6 side, while, on the contrary, ink on the dust removal device 7 side is being sucked into the ink tank from the liquid path 30. In other words, as in the first embodiment, it is possible to remove air bubbles from the liquid path by circulating ink substantially without allowing any ink to flow out from the discharge ports.

Also, by opening the valve 32 before terminating the recovery operation, the suction on the ink returning path side is suspended. Therefore, if the pump 9 is driven for a short period of time in such a state, it is possible to expel air bubbles in nozzles to the outside.

In accordance with the present embodiment, there is an advantage that the same effect is still obtainable as the first embodiment by use of only one pump.

For the first and second embodiments described above, the kind of pump is not necessarily limited. It may be possible to adopt a tube pump, geared pump, piston type pump, or the like.

(Third Embodiment)

Figure 3:
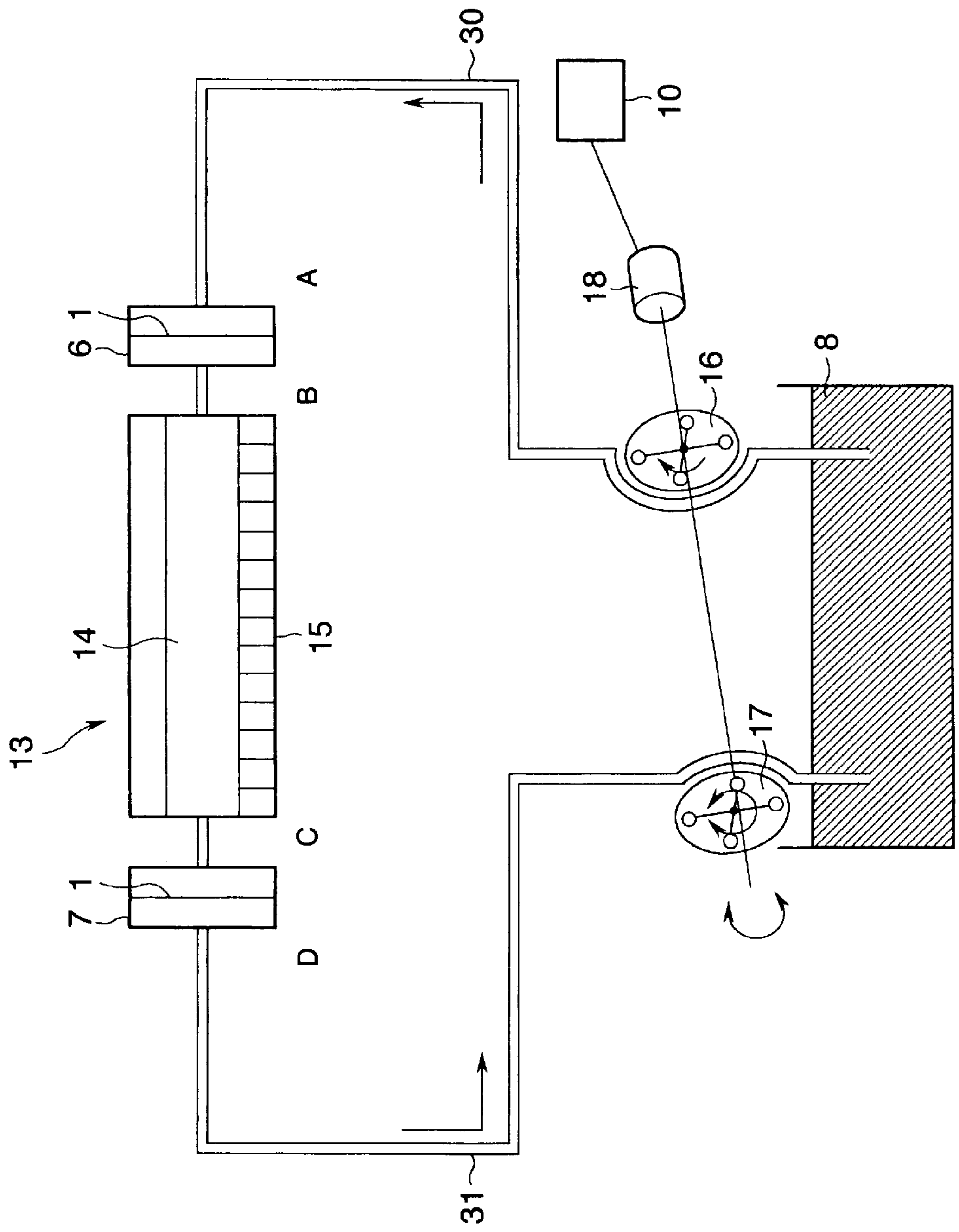
FIG. 3 is a view which schematically shows still another example of the supply recovery system of an ink jet recording apparatus in accordance with the present invention.
Figure 4:
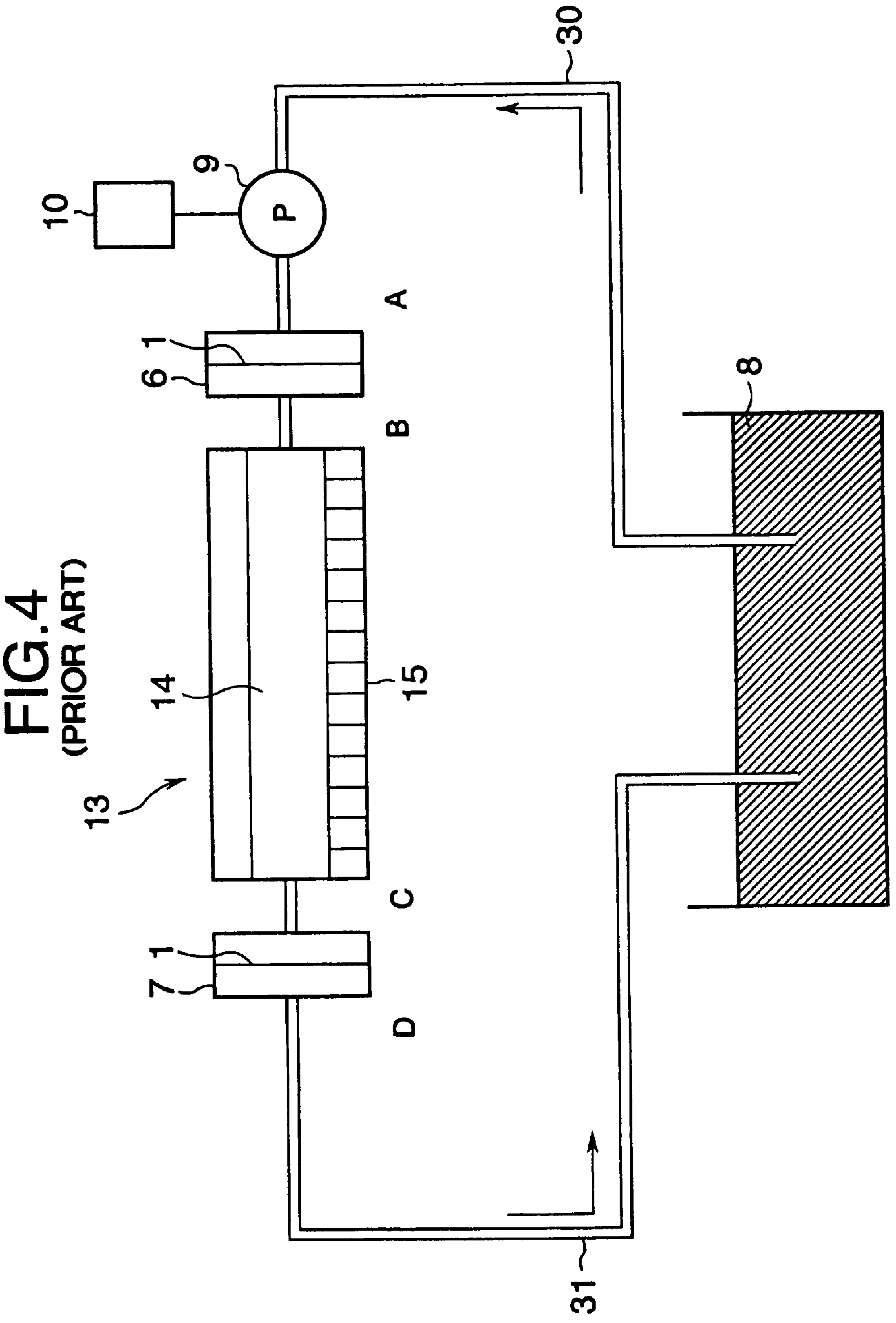
FIG.4 (PRIOR ART)
FIG. 4 is a view which schematically shows the supply recovery system of an ink jet recording apparatus in accordance with the prior art.
Figure 5:
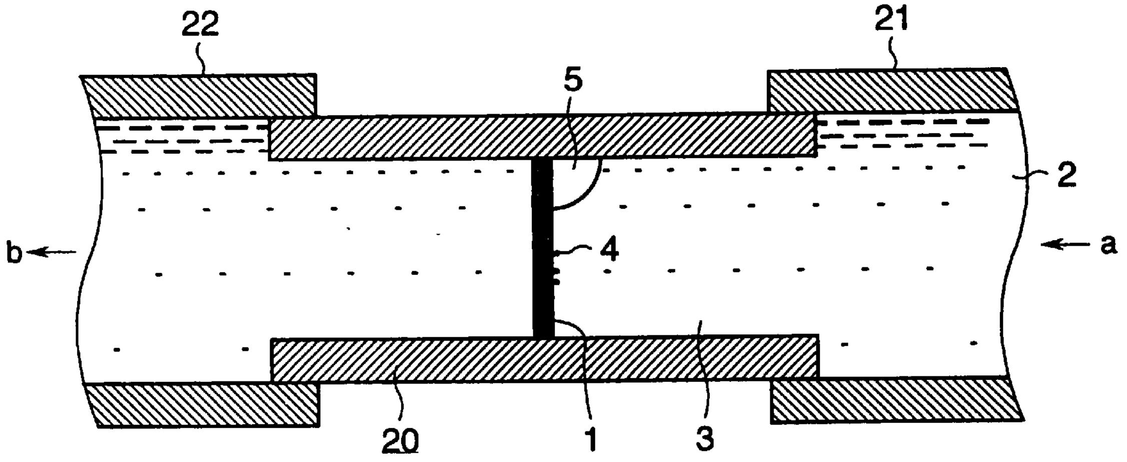
FIG.5 (PRIOR ART)
FIG. 5 is a cross-sectional view which schematically shows the dust removal device of an ink jet recording apparatus.

FIG. 3 is a view which schematically shows still another example of the apparatus in accordance with the present invention. For this apparatus, a tube pump having two tubing systems on one shaft of the motor is adopted as means for generating pressure.

Reference numerals 16 and 17 schematically designate the roller mechanisms that squeeze tubes of the tube pump. These two mechanisms are coaxially connected to the motor 18.

The roller mechanism 16 that presses and carries ink to the forwarding path is provided with a one-way clutch between the mechanism and the motor shaft, thus rotating in the direction to feed ink to the head (counterclockwise in FIG. 3). On the other hand, the roller mechanism 17 that sucks ink from the returning path is directly coupled to the motor shaft, and rotates both in the directions to suck ink, and press and carry ink depending on the rotational directions of the motor.

At the time of recording, the tubes of the tube pumps are open (not shown). Therefore, ink is being supplied as in the case of the first embodiment.

At the time of recovery operation, the motor 18 rotates counterclockwise in FIG. 3 at first, and then, both of the roller mechanisms 16 and 17 rotate counterclockwise. Therefore, the roller mechanism 16 presses and carries ink, while the roller mechanism 17 sucks ink. In this way, as in the first embodiment, it is possible to remove air bubbles from the liquid path and common liquid chamber without causing ink to flow out from the discharge ports. After that, the motor is suspended, and then, it is caused to rotate clockwise for a short period of time. At this juncture, the roller mechanism 16 is not allowed to rotate because the one-way clutch is actuated. Only the roller mechanism 17 rotates clockwise to press and carry ink toward the head. Thus, the pressure in the common liquid chamber is increased to expel air bubbles in the nozzles to the outside.

For the present embodiment, there is an advantage that only one motor can drive both pumps.

In this respect, the present invention is effectively applicable to any type of recording head, whether it is of a bubble jet type or of a recording type using piezoelectric elements or the like, if only the invention is applied to an ink jet recording apparatus that performs its recovery operation by circulating ink.

Particularly for an apparatus provided with an elongated head having many numbers of nozzles, the present invention demonstrates remarkable effects in removing air bubbles and reducing the amount of ink to be used wastefully.

As has been described above, the present invention makes it possible to significantly reduce the amount of waste ink when recovering an ink jet recording, and reliably remove air bubbles in the filter units by use of pumps of a small capacity. Therefore, not only the running costs can be reduced, but also, the costs of manufacture of the apparatus itself can be suppressed to a lower level.

What is claimed is:

1. A liquid jet recording apparatus structured to enable recording liquid to circulate by conductively connecting the recording head for discharging recording liquid and means for retaining recording liquid through a forwarding path for recording liquid to flow into the head and a returning path for recording liquid for flow out from the head, comprising:

means for generating pressure to suck recording liquid on said returning path from said head, while exerting pressure on recording liquid in said forwarding path toward said heads wherein said means for generating pressure is a plurality of pumps installed on each of said forwarding path and said returning path, and wherein the pump installed on said forwarding path is actuated earlier than the pump installed on said returning path.

2. A liquid jet recording apparatus structured to enable recording liquid to circulate by conductively connecting the recording head for discharging recording liquid and means for retaining recording liquid through a forwarding path for recording liquid to flow into the head and a returning path for recording liquid for flow out from the head, comprising:

means for generating pressure to suck recording liquid on said returning path from said head, while exerting pressure on recording liquid in said forwarding path toward said head wherein said means for generating pressure is a plurality of pumps installed on each of said forwarding path and said returning path, and wherein the pump installed on said returning path is suspended earlier than the pump installed on said forwarding path.

3. A liquid jet recording apparatus according to claims 1 or 2, further comprising:

means for controlling pressure exerted on said recording liquid by said means for generating pressure and/or controlling the time for exerting pressure on said recording liquid individually on said forwarding path and said returning path.

4. A liquid jet recording apparatus according to claims 1 or 2, further comprising:

means for controlling pressure exerted on said recording liquid by said means for generating pressure and/or controlling the time for exerting pressure on said recording liquid commonly on said forwarding path and said returning path.

5. A liquid jet recording apparatus according to claims 1 or 2, wherein means for removing foreign substances is installed on each of said forwarding path and said returning path.

6. A liquid jet recording apparatus according to claim 5, wherein said means for removing foreign substances includes filters.

7. A liquid jet recording apparatus according to claims 1 or 2, wherein said head is provided with energy generating means for generating energy to be used for discharging recording liquid.

8. A liquid jet recording apparatus according to claim 7, wherein said energy generating means is electrothermal transducing elements to generate thermal energy as said energy.

9. A liquid jet recording apparatus according to claim 7, wherein in parallel with the circulation of said recording liquid, said energy generating means is driven.

10. A liquid jet recording apparatus according to claim 8, wherein in parallel with the circulation of said recording liquid, said energy generating means is driven.

11. A liquid jet recording apparatus according to claim 2, wherein the pump installed on said forwarding path is actuated earlier than the pump installed on said returning path.

12. A method for recovering a liquid jet recording apparatus structured to enable recording liquid to circulate by conductively connecting the recording head for discharging recording liquid and means for retaining recording liquid through a forwarding path for recording liquid to flow into said head and a returning path for recording liquid to flow out from said head, comprising the step of:

circulating recording liquid by sucking said recording liquid on said returning path from said head, while exerting pressure on said recording liquid in said forwarding path toward said head; and actuating said exertion of pressure earlier than said suction.

13. A method for recovering a liquid jet recording apparatus structured to enable recording liquid to circulate by conductively connecting the recording head for discharging recording liquid and means for retaining recording liquid through a forwarding path for recording liquid to flow into said head and a returning path for recording liquid to flow out from said head, comprising the step of:

circulating recording liquid by sucking said recording liquid on said returning path from said head, while exerting pressure on said recording liquid in said forwarding path toward said head; and suspending said suction earlier than said exertion of pressure.

14. A method for recovering a liquid jet recording apparatus according to claim 13, further comprising the step of:

actuating said exertion of pressure earlier than said suction.

15. A liquid jet recording apparatus for use with a recording head for discharging liquid for recording, said apparatus comprising:

a liquid tank for retaining liquid to be supplied to said recording head;

a forwarding path for connecting between said recording head and said liquid tank;

a returning path, different from said forwarding path, for connecting between said recording head and said liquid tank;

a first pump for generating pressure to cause liquid in said forwarding path to flow in a direction from said liquid tank to said recording head; and a second pump, different from said first pump, for generating pressure to cause liquid in said returning path to flow in a direction from said recording head to said liquid tank;

wherein said first pump is actuated earlier than said second pump.

16. A liquid jet recording apparatus for use with a recording head for discharging liquid for recording, said apparatus comprising:

a liquid tank for retaining liquid to the supplied to said recording head;

a forwarding path for connecting between said recording head and said liquid tank;

a returning path, different from said forwarding path, for connecting between said recording head and said liquid tank;

a first pump for generating pressure to cause liquid in said forwarding path to flow in a direction from said liquid tank to said recording head; and a second pump, different from said first pump, for generating pressure to cause liquid in said returning path to flow in a direction from said recording head to said liquid tank;

wherein said second pump is suspended earlier than said first pump.

17. A liquid jet recording apparatus according to either of claims 1, 3, 15 or 16, wherein said first pump and said second pump are tube pumps.

18. A liquid jet recording apparatus according to either of claims 1, 2, 15 or 16, wherein said first pump and said second pump are geared pumps.

19. A liquid jet recording apparatus according to either of claims 1, 2, 15 or 16,wherein said first pump and said second pump are piston type pumps.

20. A method for recovering a liquid jet recording apparatus for use with a recording head for discharging liquid for recording, said apparatus comprising a liquid tank for retaining liquid to be supplied to said recording head, a forwarding path for connecting between said recording head and said liquid tank, a returning path, different from said forwarding path, for connecting between said recording head and said liquid tank, a first pump for generating pressure to cause liquid in said forwarding path to flow in a direction from said liquid tank to said recording head, and a second pump, different from said first pump, for generating pressure to cause liquid in said returning path to flow in a direction from said recording head to said liquid tank, wherein said method comprises the steps of:

actuating said first pump; and subsequently actuating said second pump to circulate liquid between aid recording head and said liquid tank through said forwarding path and said returning path.

21. A method for recovering a liquid jet recording apparatus for use with a recording head for discharging liquid for recording said apparatus comprising a liquid tank for retaining liquid to be supplied to said recording head, a forwarding path for connecting between said recording head and said liquid tank, a returning path, different from said forwarding path, for connecting between said recording head and said liquid tank, a first pump for generating pressure to cause liquid in said forwarding path to flow in a direction from said liquid tank to said recording head, and a second pump, different from said first pump, for generating pressure to cause liquid in said returning path to flow in a direction from said recording head to said liquid tank, wherein said method comprises the steps of:

circulating liquid between said recording head and aid liquid tank through said forwarding path and said returning path;

suspending said second pump; and subsequently suspending said first pump.

22. A liquid jet recording apparatus for use with a recording head for discharging liquid for recording, said apparatus comprising:

a liquid tank for retaining liquid to be supplied to said recording head;

a first path for connecting between said recording head and said liquid tank;

a second path, different from said first path, for connecting between said recording head and said liquid tank;

a first pump for generating pressure to cause liquid in said first path to flow in said first path; and a second pump, different from said first pump, for generating pressure to cause liquid in said second path to flow in said second path;

wherein each of said first pump and said second pump is individually actuated.

23. A liquid jet recording apparatus according to claim 22, wherein said first pump generates pressure to cause liquid in said first path to flow in a direction from said liquid tank to said recording head.

24. A liquid jet recording apparatus according to either of claims 22 or 23, wherein said second pump generates pressure to cause liquid in said second path to flow in a direction from said recording head to said liquid tank.

25. A liquid jet recording apparatus according to claim 22, wherein said first pump and said second pump are tube pumps.

26. A liquid jet recording apparatus according to claim 22, wherein said first pump and said second pump are geared pumps.

27. A liquid jet recording apparatus according to claim 22, wherein said first pump and said second pump are piston type pumps.

* * * * *

UNITED STATES PATENT AND TRADEMARK OFFICE
CERTIFICATE OF CORRECTION

PATENT NO. : 5,956,062

DATED : September 21, 1999

INVENTORS : KOUICHI OMATA et al.

It is certified that error appears in the above-identified patent and that said Letters Patent is hereby corrected as shown below:

COLUMN 1

Line 39, "of" (first occurrence) should read --with--.

COLUMN 5

Line 58, "form" should read --from--.

COLUMN 6

Line 15, "electro thermal" should read --electrothermal--.

Line 39, "(picolitter)" should read --(picoliters)--.

COLUMN 7

Line 36, "exist" should read --exit--.

UNITED STATES PATENT AND TRADEMARK OFFICE
CERTIFICATE OF CORRECTION

PATENT NO. : 5,956,062

DATED : September 21, 1999

INVENTORS : KOUICHI OMATA et al.

It is certified that error appears in the above-identified patent and that said Letters Patent is hereby corrected as shown below:

COLUMN 9

Line 52, "heads" should read --head;--.

Line 67, "head" should read --head;--.

COLUMN 11

Line 32, "the" should read --be--.

Line 51, "3," should read --2,--.

COLUMN 12

Line 25, "aid" should read --said--.

Signed and Sealed this

Thirty-first Day of October, 2000

*Attest:*

Q. TODD DICKINSON

*Attesting Officer*

*Director of Patents and Trademarks*